Oct. 8, 1968 C. P. J. SUVERKROPP 3,404,712

LEAD STRAIGHTENING DEVICE

Filed Oct. 23, 1965

INVENTOR.

Claus P. J. Suverkropp

BY Flehr and Swain

Attorneys

United States Patent Office 3,404,712

Patented Oct. 8, 1968

3,404,712

LEAD STRAIGHTENING DEVICE

Claus P. J. Suverkropp, Sunnyvale, Calif., assignor to Signetics Corporation, Sunnyvale, Calif., a corporation of California Filed Oct. 23, 1965, Ser. No. 503,410
9 Claims. (Cl. 140—147)

ABSTRACT OF THE DISCLOSURE

Lead straightening devices having straightening elements carried by a pair of pivot blocks pivoted at first and second spaced pivot points.

This invention relates to a lead straightening device and more particularly to a device for straightening leads on electronic packages.

It has been found that in the mounting of electronic packages such as the TO–5 package on plugs of the type described in copending application Ser. No. 503,513, filed Oct. 22, 1965, now Patent No. 3,325,772, that it is desirable to straighten the leads on the electronic packages. This has been found to be necessary because during the handling of the TO–5 packages, it has been found that the leads sometimes become twisted and bent making it necessary to straighten the same. Heretofore, it has been necessary to straighten such leads by the use of hand tools which is very tedious and time consuming. There is, therefore, a need for a lead straightening device which will facilitate such operations.

In general, it is an object of the present invention to provide a lead straightening device which can be utilized for straightening the leads of electronic packages.

Another object of the invention is to provide a lead straightening device of the above character which is semi-automatic.

Another object of the invention is to provide a lead straightening device of the above character which is motor operated.

Another object of the invention is to provide a lead straightening device of the above character which can operate upon a number of leads simultaneously.

Another object of the invention is to provide a lead straightening device of the above character which can be utilized on leads of different lengths and sizes.

Another object of the invention is to provide a lead straightening device of the above character which is relatively simple.

Additional objects and features of the invention will appear from the following description in which the preferred embodiment is set forth in detail in conjunction with the accompanying drawings.

Referring to the drawings.

Figures 1, 3, 4:
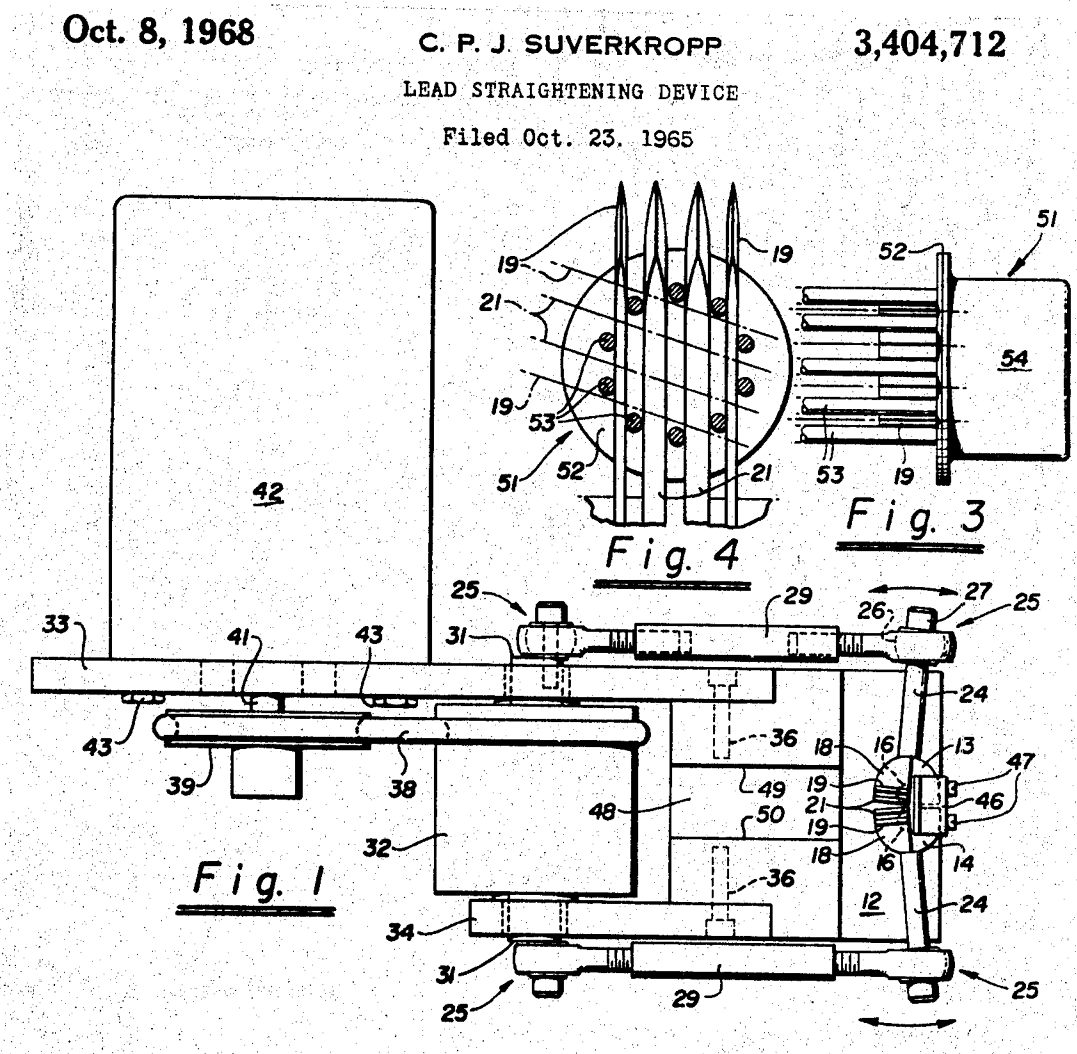
FIGURE 1 is a top plan view of a lead straightening device incorporating the present invention.
FIGURE 3 is an enlarged detailed view of a portion of the lead straightening device shown in FIGURE 1.
FIGURE 4 is a schematic illustration showing the positions of the blades in the two positions of the leads of the electronic device during the straightening operation.

In general, the lead straightening device consists of a base with a plurality of blades rotatably mounted on the base. Means is mounted on the base for causing pivotal movement of certain of the blades in one direction and for causing pivotal movement of other of the blades in an opposite direction at the same time which operates to straighten the leads of the electronic package placed therebetween.

More particularly as shown in the drawings, the lead straightening device consists of a mounting block 11 which is provided with a step 12. A pair of pivot blocks 13 and 14 are pivotally mounted upon the step 12 by pins 16 which are rotatably mounted in the step 12 and are secured therein by suitable means such as by snap rings 17. A pair of blade holders 18 are provided on each of the mounting blocks and carry blades 19 and 21 which are secured therein by suitable means such as rivets 22. The blades 19 are relatively thin blades, whereas the blades 21 are relatively thick blades for a purpose hereinafter described. The spacing between the blades is preferably only slightly greater than the diameter of the leads to be straightened.

Means is provided for pivoting the pivot blocks 13 and 14 and the blades carried thereby about the axes formed by the pins 16 and consists of rods 24 mounted in the pivot blocks and connected to spherical rod end bearings 25. The rod end bearings 25 consist of ball-like members 26 which are secured to the rods 24 by cap screws 27. The ball-like mmebers 26 are mounted in sockets 28 which are threaded into the ends of connecting members 29. Additional rod end bearings 25 are threaded into the other ends of the connecting members 29. The cap screws 27 of the additional rod end bearings are mounted eccentrically upon cylindrical extensions 31 of a large pulley 32. The pulley 32 and the extensions 31 are formed of a suitable material such as Delrin. The extensions 31 of the pulley 32 are rotatably mounted in a pair of plates 33 and 34 which are spaced and disposed parallel to each other and are mounted upon the block 11 by suitable means such as cap screws 36. It will be noted that the plate 33 is substantially larger than the plate 34.

The pulley 32 is driven by an O-ring belt 38. The belt 38 is driven by a pulley 39 mounted upon the output shaft 41 of an electric motor 42 secured to the plate 33 by suitable means such as screws 43. The motor can be of any suitable type capable of operating from a conventional source of electrical power. The output shaft 41 from the motor can have any desired speed as, for example, 22 r.p.m.

A protective guard member 46 is secured to the front of the step 12 by screws 47 and extends upwardly in front of the blades 19 and 21 to serve as a lower stop for the leads which are to be straightened.

The block 12 is formed with a recess 48 formed by spaced parallel vertical walls 49 and 50 which serves to retain the outer extremities of the leads as hereinafter described.

Operation and use of the lead straightening device may now be briefly described as follows. Let it be assumed that it is desired to straighten the leads on an electronic package 51 of a suitable type such as the TO–5 package shown in FIGURE 3 of the drawings. As is well known to those skilled in the art, such a package consists of a header 52 which is provided with a plurality of leads 53 extending therefrom. Such leads are connected to the electronic device carried by the package in a conventional manner. The leads in such a package can be of any suitable number such as ten and are arranged in a circular pattern as shown in FIGURE 4. A cap 54 is mounted on the header 52 to seal the electronic device within the package. Let it be assumed that the leads of such a package have become somewhat bent and that it is desired to straighten the same. The motor 42 is placed in operation which causes reciprocation of the connecting members 29 which, in turn, causes pivotal movement of the blocks 13 and 14 about the axes formed by the pins 16 to thus cause the blades 19 and 21 carried by the block 13 to pivot or move in one direction and the blades 19 and 21 carried by the block 14 to pivot or move in an opposite direction or, in other words, they are pivoted away from each other through a predetermined angle and then both sets of blades are returned towards each other to a minimum angle in which both sets of blades are substantially parallel to each other. Thus, it can be seen that one set of blades is moved in a clockwise direction while the other is moved in a counter-clockwise direction during one portion of the movement and vice versa during another portion of the movement caused by the connecting members 27.

Figure 2:
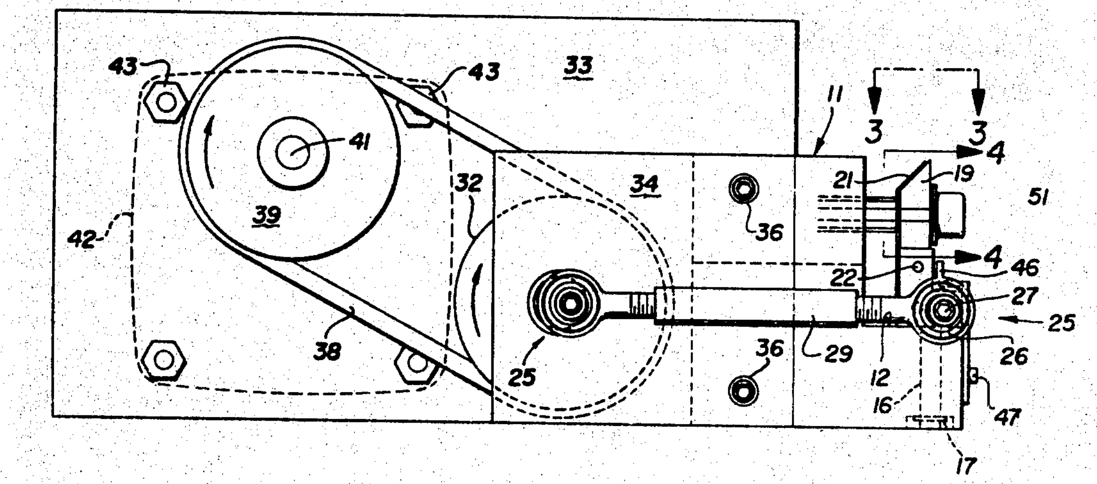
FIGURE 2 is a side elevational view of the lead straightening device shown in FIGURE 1.

While this type of movement is occurring, the can 54 of the package is grasped by one hand and the leads 53 of the package 51 are pushed downwardly over the blades 19 and 21 in the manner shown in FIGURES 3 and 4 so that the blades extend between the leads. The electronic package is positioned so that the header 52 is up against the stop or guard member 46 with the outer extremities of the leads 53 being disposed in the recess 48 as shown in FIGURE 2. Thereafter, while the blades are being pivoted about the axes 16 by the operation of the motor 42 to provide angular movement of the same into periodic engagement with the leads on the opposite sides of the blades, the leads are withdrawn laterally from the blades 19 and 21 while the outer extremities are restrained by the walls 49 and 50. It has been found that this type of movement serves to straighten the leads of the package.

After the leads of the electronic package have been passed once through the blades 19 and 21, it is generally desirable to make another pass of the leads through the blades. To do this, the electronic package 51 is rotated through approximately 90° depending upon the number of leads on the package. When ten leads are provided, it is desirable to only rotate the package through 72° to cause the blades 19 and 21 to enter between the leads in the manner shown in dotted lines in FIGURE 4. The leads are then withdrawn through the blades while the same type of blade movement is occurring. This will serve to straighten the leads in another direction.

It has been found that by making two passes of the leads through the blades in which one of the passes is substantially 90° removed with respect to the first pass, all the bands in the leads will be removed.

After this has been accomplished, the next electronic package can be taken and its leads straightened in a similar manner.

It is apparent from the foregoing that there has been provided a lead straightening device which makes it possible to rapidly straighten the many leads provided on electronic packages. The device is relatively simple in construction and is easily operated with a minimum skill. By the use of the device, it is merely necessary to make two passes of each device through the blades to straighten all the leads on the electronic package.

I claim:

1. In a lead straightening device for straightening the leads of an electronic package having a plurality of leads extending generally in one direction therefrom, a mounting block, a plurality of blades, means pivotally mounting said blades in first and second sets of blades on said mounting block whereby said first set is pivoted at a first point and said second set is pivoted at a second point spaced form the first point, said first and second sets of blades extending generally in one direction from the mounting block, and means mounted on said mounting block for causing pivotal movement of certain of said blades in one direction while causing pivotal movement of other of said blades in the opposite direction.

2. A device as in claim 1 wherein said blades consist of a plurality of narrow blades and a plurality of relatively wide blades.

3. A device as in claim 1 wherein the spacing between the blades is substantially equal to the size of the leads to be straightened.

4. In a lead straightening device, a mounting block, a pair of pivot blocks pivotally mounted in said mounting block at first and second spaced pivot points, a plurality of straightening blades carried by each of the pivot blocks and means for pivoting the pivot blocks so that one of the pivot blocks is pivoted in one direction while the other of the pivot blocks is pivoted in an opposite direction said pivotal movement causing said straightening blades carried by each pivot block to oscillate about an axis parallel to their own longitudinal axes and traverse to the longitudinal axes of the leads being straightened.

5. A device as in claim 4 wherein the blades carried by each of the pivot blocks consists of a pair of blades in which one of the blades is substantially thinner than the other of the blades and in which the spacing between the blades is substantially equal to the thickness of the leads to be straightened.

6. A device as in claim 4 wherein the means for pivoting the pivot blocks consists of an eccentric crank, means for rotating the eccentric crank, and means connecting the eccentric crank to the pivot blocks.

7. A device as in claim 6 wherein said means for rotating the eccentric crank consists of a large pulley rotatably mounted upon the mounting block, means connecting said pulley to said eccentric crank, and means for rotating said pulley.

8. A device as in claim 4 wherein the means for pivoting the pivot blocks about their pivot axes comprises rods connected to the pivot blocks, eccentric crank means rotatably mounted upon the mounting block, connecting means connecting the eccentric crank means to said rods, and means for rotating said eccentric crank means.

9. A device as in claim 4, wherein said mounting block is formed with a recess in general alignment with the blades and adapted to receive the outer extremities of the leads while they are in engagement with said blades.

References Cited

UNITED STATES PATENTS

| | | | |
|---|---|---|---|
| 3,013,590 | 12/1961 | Pechy | 140—147 |
| 3,165,126 | 1/1965 | Gartner | 140—140 |
| 3,195,584 | 7/1965 | Zimmerman et al. | 147—147 |

CHARLES W. LANHAM, *Primary Examiner.*

L. A. LARSON, *Assistant Examiner.*